United States Patent
Won et al.

(10) Patent No.: US 10,240,692 B2
(45) Date of Patent: Mar. 26, 2019

(54) FASTENING-TYPE PIPE SUPPORTING APPARATUS FOR CURVED PIPE

(71) Applicant: KEPCO ENGINEERING & CONSTRUCTION COMPANY, INC., Gyeongsangbuk-do (KR)

(72) Inventors: Youn Ho Won, Gyeonggi-do (KR); Joon Ho Lee, Gyeonggi-do (KR); Soo Kyum Kim, Gyeonggi-do (KR); Hoi Myung Kim, Gyeongsangbuk-do (KR)

(73) Assignee: KEPCO ENGINEERING & CONSTRUCTION COMPANY, INC., Gyeonggi-Do (KR)

( * ) Notice: Subject to any disclaimer, the term of this patent is extended or adjusted under 35 U.S.C. 154(b) by 0 days.

(21) Appl. No.: 15/384,557

(22) Filed: Dec. 20, 2016

(65) Prior Publication Data

US 2017/0191583 A1    Jul. 6, 2017

(30) Foreign Application Priority Data

Dec. 31, 2015   (KR) .................. 10-2015-0190809

(51) Int. Cl.
*F16L 3/10*     (2006.01)
*F16L 3/11*     (2006.01)
(Continued)

(52) U.S. Cl.
CPC .......... *F16L 3/1091* (2013.01); *F16L 3/1016* (2013.01); *F16L 3/11* (2013.01); *F16L 3/1226* (2013.01); *F16L 43/02* (2013.01); *F16B 43/02* (2013.01)

(58) Field of Classification Search
CPC ......... F16L 3/1091; F16L 3/11; F16L 3/1016; F16L 43/02; F16L 3/10; F16L 3/1008;
(Continued)

(56) References Cited

U.S. PATENT DOCUMENTS 806,192 A * 12/1905 Russel .................. F16L 3/14
                                                 248/59
953,707 A *  4/1910 Pearce .................. F16L 3/14
                                                 126/318
(Continued)

FOREIGN PATENT DOCUMENTS

CN      -202082542 U  * 12/2011
DE      102007004682 A1   7/2008
(Continued)

OTHER PUBLICATIONS

Extended European Search Report dated May 23, 2017 of European Patent Application No. 16203493.8.

*Primary Examiner* — Ingrid M Weinhold
(74) *Attorney, Agent, or Firm* — Nixon Peabody LLP; Jeffrey L. Costellia

(57) ABSTRACT

A fastening-type pipe supporting apparatus capable of supporting a curved pipe against loads acting on a curved portion of the pipe via clamps having curved surfaces and being easily attached to and detached from the curved portion of the pipe. The fastening-type pipe supporting apparatus includes: a first clamp having a semicircular cross-sectional shape and a curved surface with a curvature to surround the curved portion of a pipe; a second clamp having a semicircular cross-sectional shape and a curved surface with a curvature to surround the curved portion of the pipe, the second clamp being coupled to the first clamp; a connection bolt coupling the first clamp with the second clamp; and a washer placed around the connection bolt.

3 Claims, 10 Drawing Sheets

(51) Int. Cl.
*F16L 43/02* (2006.01)
*F16L 3/12* (2006.01)
*F16B 43/02* (2006.01)

(58) Field of Classification Search
CPC ....... F16L 3/1075; F16L 3/1083; F16L 3/133; F16L 3/14; F16L 21/06; F16L 3/1226; F16B 43/02
USPC ............ 248/58, 59, 62, 63, 67.7, 74.1, 74.4; 285/373, 419, 420; 138/106, 107, 110, 138/158–161, 99
See application file for complete search history.

(56) References Cited

U.S. PATENT DOCUMENTS

| | | | | |
|---|---|---|---|---|
| 1,122,632 A * | 12/1914 | Phelps | ............... | F16L 17/04 174/650 |
| 1,211,784 A * | 1/1917 | Stuart | ............... | B65G 53/523 285/16 |
| 1,832,350 A * | 11/1931 | Beaver | ............... | B65F 1/0093 193/1 |
| 2,372,674 A * | 4/1945 | Clyde | ............... | F16L 3/1226 248/65 |
| 2,412,394 A * | 12/1946 | Giles | ............... | F16L 21/06 285/147.1 |
| 2,440,864 A * | 5/1948 | Liss | ............... | F16L 55/178 285/148.6 |
| 2,560,114 A * | 7/1951 | Kennon | ............... | F16L 21/005 285/133.21 |
| 2,700,988 A * | 2/1955 | Smisko | ............... | F16L 35/00 138/109 |
| 2,918,239 A * | 12/1959 | Wirth | ............... | F16L 3/1016 138/106 |
| 2,942,820 A * | 6/1960 | Sherburne | ............... | F16L 3/00 248/62 |
| 3,165,286 A * | 1/1965 | Johnson | ............... | F16L 3/1226 138/110 |
| 3,694,009 A * | 9/1972 | Phillips | ............... | F16L 41/06 285/197 |
| 4,130,300 A * | 12/1978 | Sheridan | ............... | F16L 57/06 285/16 |
| 4,461,498 A * | 7/1984 | Kunsman | ............... | F16L 57/06 285/112 |
| 4,633,913 A * | 1/1987 | Carty | ............... | F16L 57/06 138/147 |
| 4,733,889 A * | 3/1988 | Haines | ............... | F16L 57/06 285/16 |
| 4,889,168 A * | 12/1989 | Kerzich | ............... | F16L 35/00 138/103 |
| 4,909,462 A * | 3/1990 | Usui | ............... | F16L 3/1226 248/68.1 |
| 5,735,551 A * | 4/1998 | Whitman | ............... | F16L 55/18 285/15 |
| 6,450,551 B1 * | 9/2002 | Lee | ............... | F16L 17/04 285/373 |
| 6,779,762 B2 * | 8/2004 | Shibuya | ............... | F16L 3/11 248/62 |
| 6,837,787 B2 * | 1/2005 | Crook | ............... | F24F 13/0209 138/106 |
| 7,140,579 B2 * | 11/2006 | Kirschner | ............... | F16L 3/1016 248/230.5 |
| 7,210,505 B2 * | 5/2007 | Harpenau | ............... | F16L 9/17 138/157 |
| 7,325,776 B2 * | 2/2008 | Shibuya | ............... | F16L 3/1016 24/284 |
| 7,527,225 B1 * | 5/2009 | Schulz | ............... | F16L 3/1226 248/56 |
| 7,644,956 B2 * | 1/2010 | Crook | ............... | F16L 35/00 285/114 |
| 7,740,211 B2 * | 6/2010 | Dukes | ............... | H02G 1/08 24/285 |
| 7,914,047 B2 * | 3/2011 | Crook | ............... | F16L 3/1226 285/24 |
| 7,950,418 B2 * | 5/2011 | Wolf | ............... | F16L 55/1683 138/157 |
| 8,038,175 B2 * | 10/2011 | Crook | ............... | F16L 3/02 248/316.1 |
| 8,646,732 B2 * | 2/2014 | Birch | ............... | F16L 1/0246 248/59 |
| 8,718,222 B2 * | 5/2014 | Abura | ............... | G21C 15/25 248/62 |
| 9,046,197 B2 * | 6/2015 | Cousineau | ............... | F16L 3/1016 |
| 2005/0184509 A1 * | 8/2005 | Crook | ............... | F16L 35/00 285/24 |
| 2005/0230569 A1 * | 10/2005 | Kirschner | ............... | F16L 3/1016 248/74.1 |
| 2006/0102242 A1 * | 5/2006 | Harpenau | ............... | F16L 9/17 138/157 |
| 2006/0226300 A1 * | 10/2006 | Shibuya | ............... | F16L 3/1016 248/62 |
| 2008/0205578 A1 * | 8/2008 | Abura | ............... | G21C 15/25 376/372 |
| 2010/0206417 A1 * | 8/2010 | Wolf | ............... | F16L 55/1683 138/99 |
| 2013/0187013 A1 | 7/2013 | Minami | | |
| 2014/0008500 A1 * | 1/2014 | Cousineau | ............... | F16L 3/1016 248/62 |

FOREIGN PATENT DOCUMENTS

JP 5162371 B2 3/2013
KR 20050076367 A 7/2005

* cited by examiner

FASTENING-TYPE PIPE SUPPORTING APPARATUS FOR CURVED PIPE

CROSS-REFERENCE TO RELATED APPLICATION

This application claims the benefit of Korean Patent Application No. 10-2015-0190809, filed on Dec. 31, 2015, in the Korean Intellectual Property Office, the disclosure of which is incorporated herein in its entirety by reference.

BACKGROUND

1. Field

One or more example embodiments relate to an apparatus for supporting a curved portion of a pipe, more particularly, to a fastening-type pipe supporting apparatus capable of supporting a curved pipe against loads acting on the curved portion of the pipe via clamps having curved surfaces and being easily attached to and detached from the curved portion of the pipe.

2. Description of the Related Art

In general, pipes having various shapes are used in power plants and other industrial plants. The pipes may include typically straight portions and curved portions and various loads such as pipe weights, thermal expansion loads, vibration loads, earthquake loads, pipe break loads, or impact loads may act thereon. Pipe supporting structures or apparatuses are used to prevent deformation or destruction of piping systems caused by such loads.

Pipe supporting structures or apparatuses may be broadly classified into an attachment-type and a fastening-type. The attachment-type may include parts such as lugs or stanchions directly connected to pipes by a method such as welding, forging, or casting and the fastening-type may include supporting parts connected to pipes using mechanical parts such as clamps, bolts, or pins.

For example, in the case of the attachment-type, an attachment part is directly welded to a pipe, and thus, the attachment part is not separable from the pipe. Thus, when it is required to measure the thickness of a curved portion of a pipe so as to verify the amount of internal corrosion of the pipe, the attachment part welded to the curved portion of the pipe makes it impossible to measure the thickness of the curved portion of the pipe. In addition, the attachment-type has a negative effect on the structural integrity of pipes and requires an additional local stress evaluation because of parts welded to pipes. Thus, the fastening-type is widely used. Compared to the attachment-type apparatuses, the fastening-type pipe supporting apparatuses are easily attached to and detached from pipes, and it is easy to install fastening-type pipe supporting apparatuses on pipes in the field.

Pipe supporting structures or apparatuses are installed on straight portions or curved portions of pipes so as to maintain pipe stresses less than an allowable stress in the process of pipe stress analysis. In general, pipe supporting structures or apparatuses configured to be installed on straight portions of pipes are of the attachment-type or the fastening-type. Various fastening-type pipe supporting apparatuses for straight portions of pipes have been developed. For example, straight portion clamps 10a and 10b shown in FIGS. 1A and 1B are widely used.

However, the development of fastening-type pipe supporting apparatuses for curved portions of pipes is not yet sufficient, and thus only attachment-type pipe supporting structures are used for curved portions of pipes. Referring to FIGS. 2A and 2B, a lug 30 or a stanchion 40 is welded to a curved portion 20 of a pipe. As described above, however, such an attachment-type pipe supporting structure is practically not separable from a pipe after the attachment-type pipe supporting structure is welded to the pipe, and thus, it is practically impossible to measure the thickness of the curved portion of the pipe for verifying internal corrosion at the curved portion of the pipe. In addition, such attachment-type pipe supporting structures have a negative effect on the structural integrity of pipes, and even more, an additional local stress evaluation is required because of parts welded to pipes.

Therefore, in general, pipe supporting structures or apparatuses are installed on straight portions of pipes except for the case in which pipe supporting structures or apparatuses have to be vitally installed on curved portions of pipes to maintain pipe stresses less than an allowable stress. However, if pipe supporting structures or apparatuses are installed on only straight portions of pipes as described above, it is difficult to select optimal positions for supporting loads. For example, even though pipe stress analysis results show that the curved portion of a pipe is the most effective positions for supporting loads, an additional pipe stress analysis has to be performed to select a pipe supporting structure or apparatus installed on the only straight portion of the pipe instead of the curved portion of the pipe. In addition, according to the results of the additional pipe stress analysis, additional supporting structures or apparatuses may be required. That is, because of limitations of the pipe supporting structures or apparatuses for curved portions of pipes, it is difficult to select optimal installation positions for pipe supporting structures or apparatuses.

SUMMARY

One or more example embodiments include a fastening-type pipe supporting apparatus capable of supporting a curved pipe against loads acting on a curved portion of the pipe via clamps having curved surfaces and being easily attached to and detached from the curved portion of the pipe.

Additional aspects will be set forth in part in the description which follows and, in part, will be apparent from the description, or may be learned by practice of the presented embodiments.

According to one or more embodiments, a fastening-type pipe supporting apparatus for a curved portion of a pipe includes: a first clamp having a semicircular cross-sectional shape and a curved surface with a curvature to surround the curved portion of the pipe; a second clamp having a semicircular cross-sectional shape and a curved surface with a curvature to surround the curved portion of the pipe, the second clamp being coupled to the first clamp; a connection bolt coupling the first clamp with the second clamp; and a washer placed around the connection bolt.

A side of the washer may be curved with a curvature, and another side of the washer may be flat. The fastening-type pipe supporting apparatus may further include a supporting part coupled to the connection bolt and supporting the curved portion of the pipe.

The first clamp may include first connection portions protruding from both lateral ends of the first clamp and including a plurality of first connection holes; the second clamp may include second connection portions protruding from both lateral ends of the second clamp and including a plurality of second connection holes; a plurality of connection bolts may be inserted into the first connection holes and the second connection holes; and a supporting part may be coupled to the connection bolts.

A bracket including a plurality of holes may be provided on the curved surface of the first clamp or the curved surface of the second clamp, and a plurality of supporting parts may be coupled to the bracket.

The supporting part or the supporting parts may include at least one of struts, rods, springs, snubbers, dampers, or sway braces. At least one of brackets, stanchions, lugs, shoes, or skirts may be provided on the curved surface of the first clamp or the curved surface of the second clamp so as to support the curved portion of the pipe.

The fastening-type pipe supporting apparatus may further include nuts tightened on the connection bolts, wherein the washer may include first washers between ends of the connection bolts and the first connection holes, and second washers between the nuts and the second connection holes, wherein sides of the first and second washers may be curved with a curvature, and other sides of the first and second washers may be flat. A flat portion on the first clamp or the second clamp may be provided, and the flat portion may have a uniform height along the curved surface of the first clamp or the second clamp.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1A:
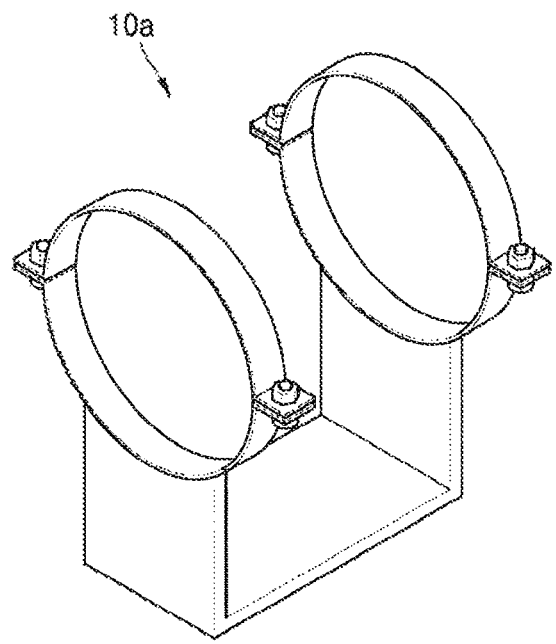
FIG. 1A and FIG. 1B illustrate an exemplary straight portion clamp of the related art.
Figure 1B:
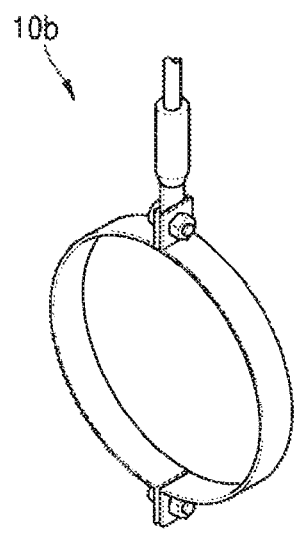
Figure 2A:
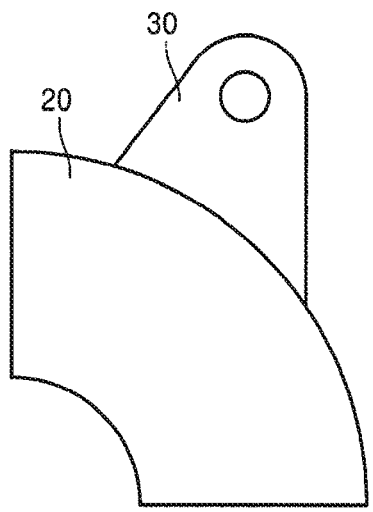
FIG. 2A and FIG. 2B illustrate an exemplary attachment-type pipe supporting structure used for curved portions of pipes in the related art.
Figure 2B:
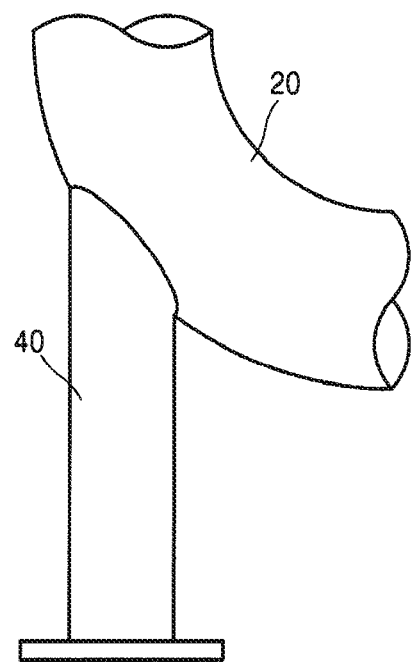

Reference will now be made in detail to embodiments, examples of which are illustrated in the accompanying drawings, wherein like reference numerals refer to like elements throughout. In this regard, the present example embodiments may have different forms and should not be construed as being limited to the descriptions set forth herein. Accordingly, the example embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

Example embodiments relate to a fastening-type pipe supporting apparatus configured to support a curved pipe against loads acting on the curved portion of the pipe using clamps having curved surfaces and to be easily attached to and detached from the curved portion of a pipe. Hereinafter, the embodiments will be described with reference to the accompanying drawings.

Figure 3:
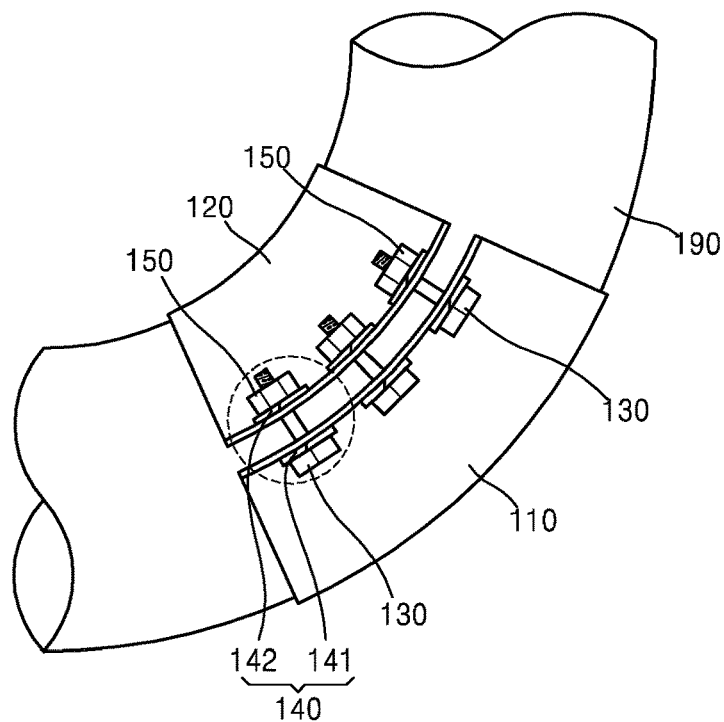
FIG. 3 is a perspective view illustrating a fastening-type pipe supporting apparatus for a curved portion of a pipe according to an example embodiment.

Referring to FIG. 3, according to an example embodiment, a fastening-type pipe supporting apparatus 100 for a curved portion of a pipe may include a first clamp 110, a second clamp 120, connection bolts 130, and washers 140.

Each of the first clamp 110 and the second clamp 120 has a semicircular cross-sectional shape and a surface curved with a curvature to surround a curved portion 190 of a pipe. The first clamp 110 and the second clamp 120 are shaped according to the shape of the curved portion 190 such that the first clamp 110 and the second clamp 120 may surround the curved portion 190. Since the first clamp 110 and the second clamp 120 have a semicircular cross-sectional shape, a circular shape is formed by joining the first clamp 110 with the second clamp 120, and the curved portion 190 of the pipe may be placed in the circular shape.

The first clamp 110 and the second clamp 120 may be variously shaped according to the shape of the curved portion 190. According to an example embodiment, the first clamp 110 and the second clamp 120 may have curved surfaces with given radii of curvature. That is, semicircular cross-sections of the first clamp 110 and the second clamp 120 may extend along a curved shape having a certain radius of curvature. In this case, the radius of curvature of the first clamp 110 may be greater than the radius of curvature of the second clamp 120. Thus, the first clamp 110 may be placed on an outer side of the curved portion 190, and the second clamp 120 may be placed on an inner side of the curved portion 190.

However, the shapes of the first clamp 110 and the second clamp 120 are not limited thereto. That is, the first clamp 110 and the second clamp 120 may have various shapes. For example, the first clamp 110 and the second clamp 120 may have the same radius of curvature (in this case, the first clamp 110 and the second clamp 120 may cover lateral sides of the curved portion 190, respectively). Although the first clamp 110 and the second clamp 120 are described in the current example embodiment, a first clamp, a second clamp, and a third clamp may be also used in other example embodiments. However, since many clamps require many coupling parts, two clamps may be used.

The first clamp 110 and the second clamp 120 are coupled to each other to support the curved portion 190. The first clamp 110 and the second clamp 120 may be coupled to each other using the connection bolts 130.

That is, the connection bolts 130 may be used to couple the first and second clamps 110 and 120 together. The connection bolts 130 may have any shape as long as the connection bolts 130 are capable of coupling the first and second clamps 110 and 120 together.

According to an example embodiment, the first clamp 110 includes first connection portions 111 protruding from both lateral ends of the first clamp 110 and having a plurality of first connection holes 112, and the second clamp 120 includes second connection portions 121 protruding from both lateral ends of the second clamp 120 and having a plurality of second connection holes 122. The first and second connection portions 111 and 121 may protrude from both lateral sides of semicircular cross-sections of the first and second clamps 110 and 120 and may extend along the curved surfaces of the first and second clamps 110 and 120. As depicted in FIG. 3, each of the connection portions 111 and each of the connection portions 121 may comprise a concave surface and a convex surface extending the full length of the first clamp 110 and the second clamp 120, respectively.

The first and second clamps 110 and 120 may be coupled to each other by inserting the connection bolts 130 into the first and second connection holes 112 and 122 of the first and second connection portions 111 and 121.

The washers 140 may be used to enhance the degree of coupling between the first and second clamps 110 and 120. The washers 140 may be placed around the connection bolts 130, and loads applied to the connection bolts 130 may be transmitted to the first and second clamps 110 and 120 through the washers 140.

The washers 140 may be in contact with the first and second connection portions 111 and 121. Thus, sides of the washers 140 making contact with the first and second connection portions 111 and 121 extending along the curved surfaces of the first and second clamps 110 and 120 may be curved with a given curvature, and the other sides of the washers 140 may be flat. That is, the washers 140 may have sides shaped according to the curved surfaces of the first and second clamps 110 and 120. Thus, the washers 140 may be brought into contact with the first and second connection portions 111 and 121 without gaps therebetween, and the first and second clamps 110 and 120 may be firmly coupled to each other using the connection bolts 130 and the washers 140.

Figure 4:
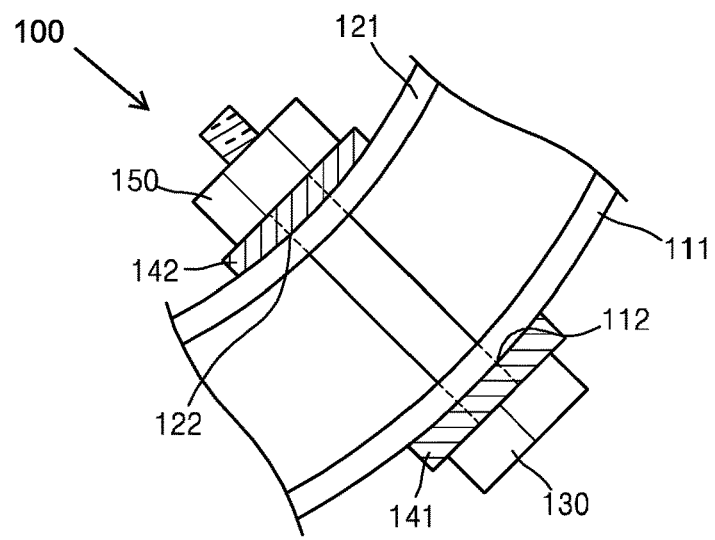
FIG. 4 is an enlarged view illustrating a portion of FIG. 3.

Referring to FIG. 4, according to an example embodiment, the fastening-type pipe supporting apparatus 100 may further include nuts 150. The nuts 150 may be tightened on the connection bolts 130. The first and second clamps 110 and 120 may be firmly coupled to each other by inserting the connection bolts 130 into the first and second connection holes 112 and 122 and tightening the nuts 150 on the connection bolts 130.

A plurality of washers 140 may be used for each connection bolt 130. For example, two washers 140 may be used for each connection bolt 130. That is, two washers 140 may be placed around one connection bolt 130. For example, the washers 140 may include first washers 141 between ends of the connection bolts 130 and the first connection holes 112, and second washers 142 between the nuts 150 and the second connection holes 122.

Coupling positions of the first washers 141 and the second washers 142 are as follows. The first washers 141 are placed around the connection bolts 130, and then the connection bolts 130 are inserted into the first and second connection holes 112 and 122. In the state in which the connection bolts 130 are inserted in the first and second connection holes 112 and 122, the second washers 142 are placed around the connection bolts 130, and the nuts 150 are coupled to the connection bolts 130.

Sides of the first and second washers 141 and 142 may be curved with given curvatures, and the other sides of the first and second washers 141 and 142 may be flat. Referring to FIG. 4, since the first washers 141 are placed between the connection bolts 130 and the first connection holes 112, the first washers 141 may have concavely curved sides. However, since the second washers 142 are placed between the nuts 150 and the second connection holes 122, the second washers 142 may have convexly curved sides.

Accordingly, the first and second washers 141 and 142 may be firmly coupled to the connection bolts 130, the nuts 150, and the first and second connection holes 112 and 122 without gaps therebetween. Since the heads of the connection bolts 130 and the nuts 150 are flat, the other sides of the first and second washers 141 and 142 may be flat.

A coupling force may be transmitted from the connection bolts 130 and the nuts 150 to the first clamp 110 and the second clamp 120 through the first washers 141 and the second washers 142, and thus the first and second clamps 110 and 120 may be firmly coupled to each other. The washers 140 enhancing the coupling strength between the first and second clamps 110 and 120 may prevent the fastening-type pipe supporting apparatus 100 from sliding on the curved portion 190. If both sides of the first and second washers 141 and 142 are flat, gaps may be formed between the first washers 141 and the first connection holes 112 and between the second washers 142 and the second connection holes 122. Due to such gaps, the washers 140 may be easily deformed by loads applied to the fastening-type pipe supporting apparatus 100, and thus the coupling strength between the first and second clamps 110 and 120 may be lowered.

According to an example embodiment, the fastening-type pipe supporting apparatus 100 may further include supporting parts 170 (refer to FIG. 5) configured to be coupled to the connection bolts 130 to support the curved portion 190 of the pipe. The supporting parts 170 may transmit loads acting on the fastening-type pipe supporting apparatus 100 to fixed positions (such as positions of a structure capable of enduring the load). For example, ends of the supporting parts 170 may be connected to the fastening-type pipe supporting apparatus 100, and other ends of the supporting parts 170 may be connected to fixed positions.

According to an example embodiment, the supporting parts 170 may be coupled to the connection bolts 130 between the first and second connection holes 112 and 122. That is, ends of the connection bolts 130, the first washers 141, the first connection holes 112, the supporting parts 170, the second connection holes 122, the second washers 142, and the nuts 150 may be sequentially arranged along the connection bolts 130. Since the supporting parts 170 are placed between the first and second connection holes 112 and 122, the supporting parts 170 may be prevented from being separated from the fastening-type pipe supporting apparatus 100.

Figure 5:
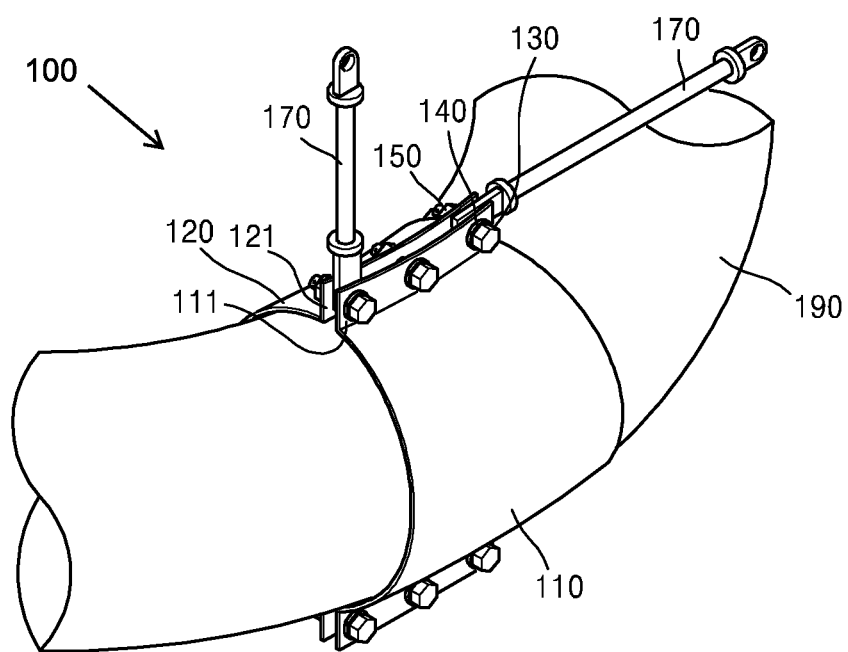
FIG. 5 is a view illustrating a state in which supporting parts are connected to connection bolts of the fastening-type pipe supporting apparatus for the curved portion of a pipe according to an example embodiment.

Referring to FIG. 5, the first and second connection holes 112 and 122 are formed in the first and second connection portions 111 and 121. The supporting parts 170 may be coupled to the connection bolts 130 by inserting the connection bolts 130 into the first and second connection holes 112 and 122. A plurality of supporting parts 170 may be installed in two or more directions to support the curved portion 190 in various directions.

One supporting part 170 may be connected to one connection bolt 130. However, this is a non-limiting example. For example, a plurality of supporting parts 170 may be connected to one connection bolt 130.

According to an embodiment, the fastening-type pipe supporting apparatus 100 may further include a bracket 160 (refer to FIG. 6) provided on the curved surface of the first clamp 110 or the curved surface of the second clamp 120. The bracket 160 may include protrusion parts 162 extending from the curved surface of the first clamp 110 or the second clamp 120, and holes 161 may be formed in the protrusion parts 162.

Figure 6:
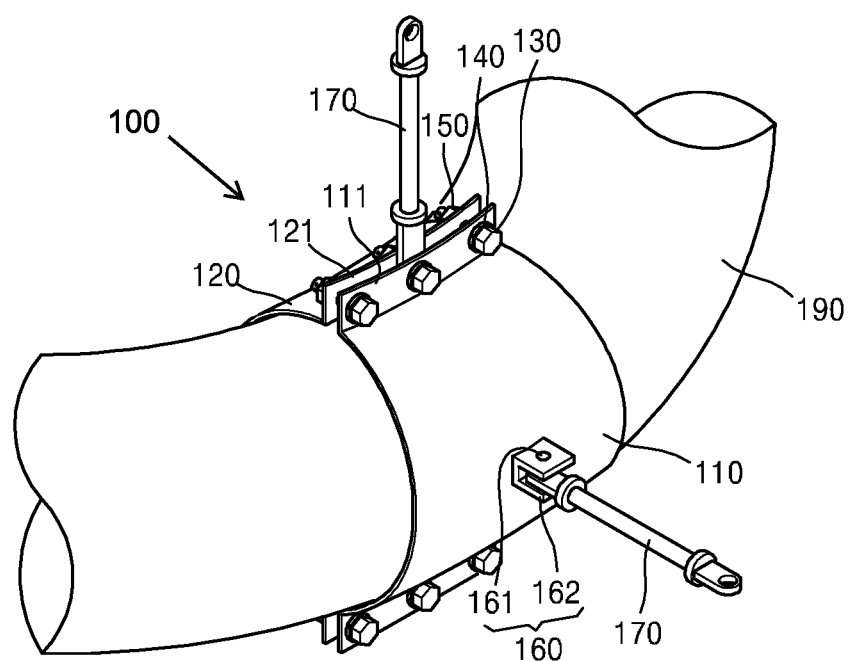
FIG. 6 is a view illustrating a state in which supporting parts are connected to the connection bolts and a bracket of the fastening-type pipe supporting apparatus according to an example embodiment.

Referring to FIG. 6, one supporting part 170 may be coupled to the bracket 160. The position of the bracket 160 may be variously selected according to the installation position of the supporting part 170. The number of the protrusion parts 162 of the bracket 160 may be two or more. The holes 161 are respectively formed in the protrusion parts 162, and an end of the supporting part 170 is coupled between the protrusion parts 162. For example, the bracket 160 and the supporting part 170 may be coupled to each other using a pin or hinges. Any other structure may be used to couple the bracket 160 and the supporting part 170 to each other.

Figure 7:
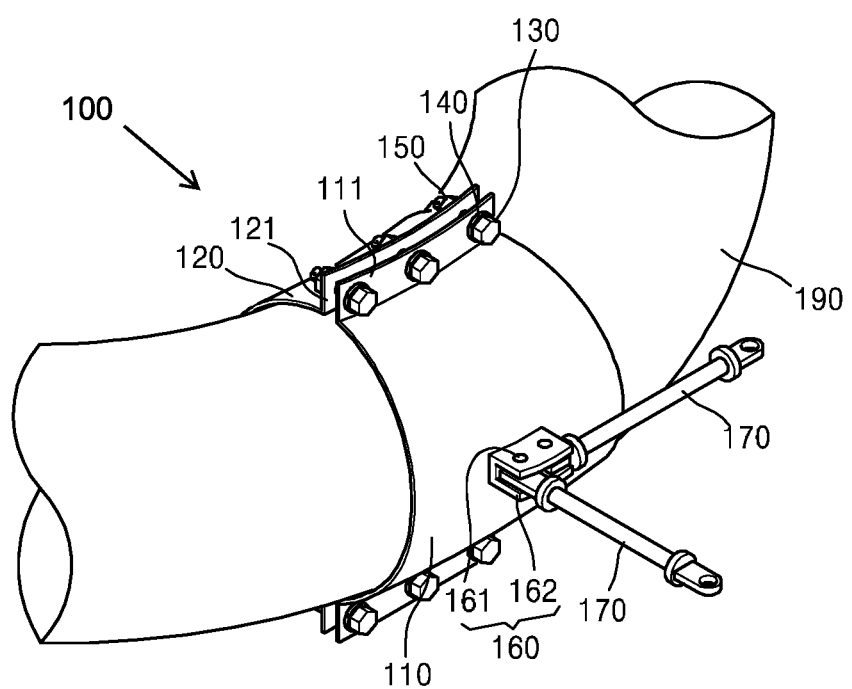
FIG. 7 is a view illustrating a state in which a plurality of supporting parts are connected to the bracket of the fastening-type pipe supporting apparatus according to an example embodiment.

Referring to FIG. 7, a plurality of holes 161 may be formed in each of the protrusion parts 162 of the bracket 160. A plurality of supporting parts 170 may be coupled using the plurality of holes 161 in more than at least one direction. In this manner, the curved portion 190 may be supported in more than at least one direction.

The supporting parts 170 may be respectively coupled to the connection bolts 130 and the bracket 160 or may be coupled to only the connection bolts 130 or the bracket 160 as necessary. Alternatively the supporting parts 170 may be coupled to simultaneously both the connection bolts 130 and the bracket 160.

The supporting parts 170 may include at least one of struts, rods, springs, snubbers, dampers, or sway braces. The supporting parts 170 may be constituted by only struts or by combinations of struts, rods, springs, snubbers, dampers or sway braces as necessary. Ends of the supporting parts 170 may be coupled to the connection bolts 130 or the bracket 160, and other ends of the supporting parts 170 may be coupled to fixed positions to transmit loads acting on the curved portion 190 to the fixed positions. The supporting parts 170 are not limited to struts, rods, springs, snubbers, dampers, or sway braces. That is, various structures or devices may be used as the supporting parts 170 to transmit loads acting on the curved portion 190. The structures of struts, rods, springs, snubbers, dampers, and sway braces are well-known, and thus detailed descriptions thereof will not be presented here.

Figure 8:
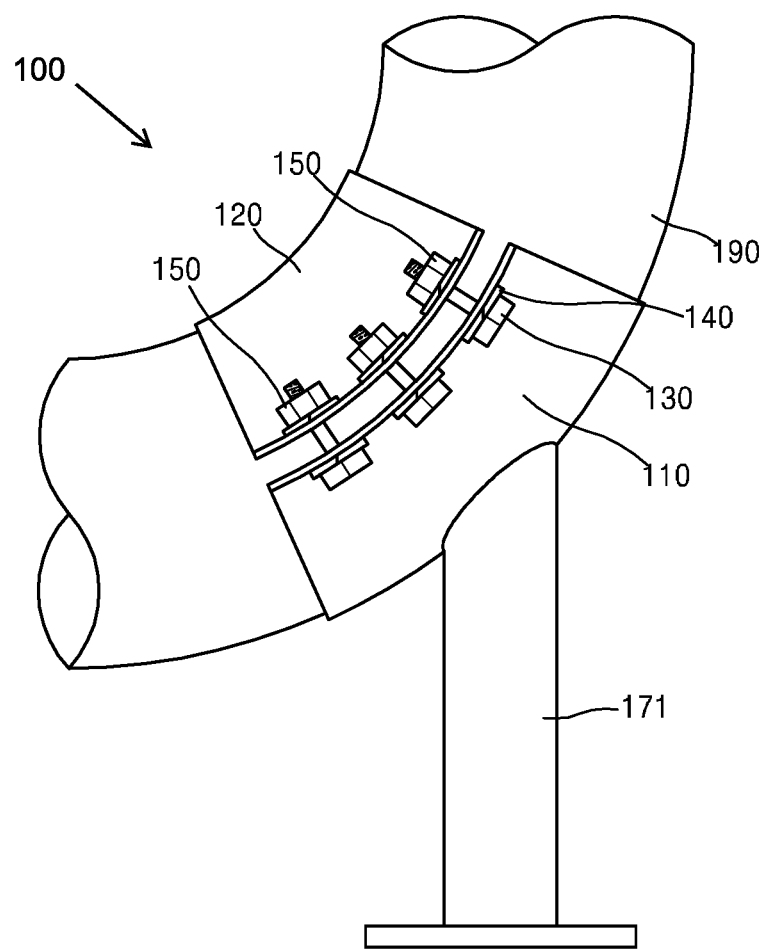
FIG. 8 is a view illustrating a state in which a stanchion is coupled to the fastening-type pipe supporting apparatus according to an example embodiment.
Figure 9:
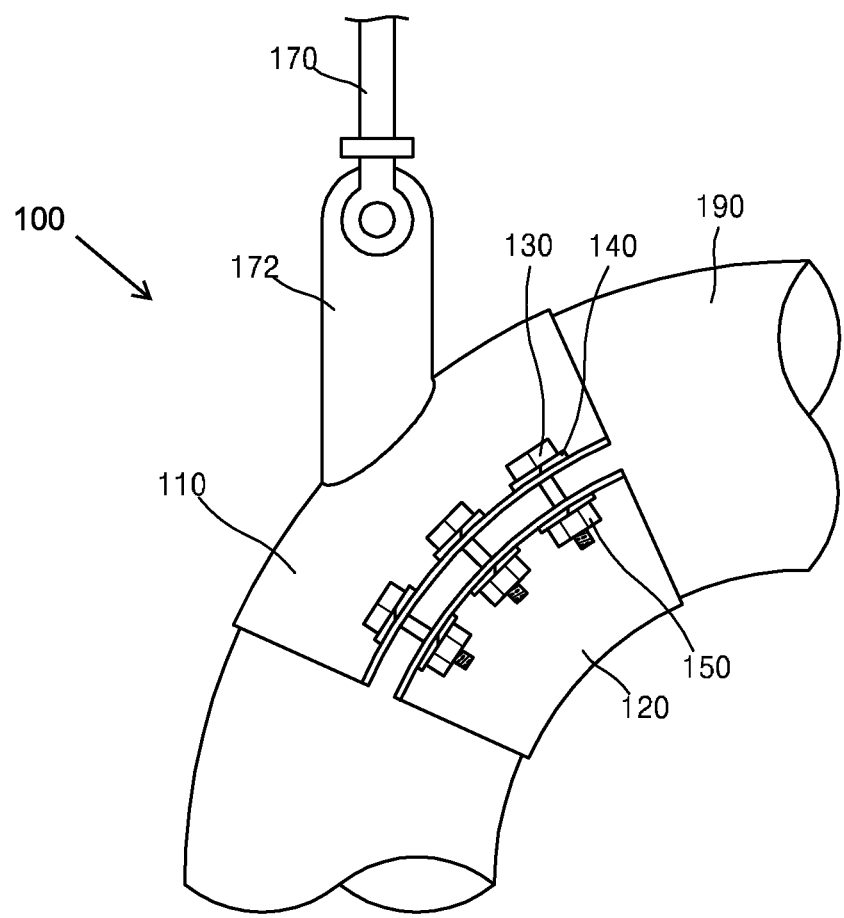
FIG. 9 is a view illustrating a state in which a lug is coupled to the fastening-type pipe supporting apparatus according to an example embodiment.

Referring to FIGS. 8 and 9, according to an embodiment, the fastening-type pipe supporting apparatus 100 may further include at least one of a bracket 160, a stanchion 171, a lug 172, a shoe (not shown), or a skirt (not shown) on the curved surface of the first clamp 110 or the curved surface of the second clamp 120. The bracket 160, the stanchion 171, the lug 172, the shoe (not shown), and the skirt (not shown) are attachment parts for supporting the curved portion 190 and may be provided at various positions of the first clamp 110 or the second clamp 120 as necessary.

A plurality of brackets 160, a plurality of stanchions 171, a plurality of lugs 172, a plurality of shoes (not shown), a plurality of skirts (not shown), or a combination thereof may be attached to the curved portion 190 in more than at least one direction. Like the supporting parts 170, the stanchions 171, the shoes (not shown), and the skirts (not shown) may directly support loads acting on the curved portion 190. The brackets 160 and the lugs 172 may be welded to the first clamp 110 or the second clamp 120, and the supporting parts 170 may be coupled to the brackets 160 and the lugs 172.

In the related art, stanchions or lugs are directly welded to the curved portion 190 of a pipe, thereby making it impossible to measure the thickness of the curved portion, decreasing the structural integrity of the pipe, and requiring an additional local stress evaluation for the pipe. According to the embodiment, however, the bracket 160, the stanchion 171, the lug 172, the shoe (not shown), or the skirt (not shown) is welded to the first clamp 110 or the second clamp 120, and thus the above-mentioned problems of the related art may be solved.

In addition, since the stanchion 171, the lug 172, the shoe (not shown), or the skirt (not shown) is welded to the first clamp 110 or the second clamp 120, damage that may be caused by a heat-affected zone during a thinwall pipe welding process may be prevented, and the damage possibility of the pipe (the pressure retaining part) caused by a damaged pipe supporting apparatus may be eliminated, thereby improving considerably the safety of a power plant.

FIG. 8 illustrates an attached stanchion 171, and FIG. 9 illustrates an attached lug 172. The bracket 160, the stanchion 171, the lug 172, the shoe (not shown), and the skirt (not shown) are well-known structures, and thus detailed descriptions thereof will not be presented here.

The fastening-type pipe supporting apparatus 100 may support a pipe using only the first clamp 110 or the second clamp 120 without using the supporting parts 170, the bracket 160, the stanchion 171, the lug 172, the shoe (not shown), or the skirt (not shown). To this end, a flat portion 180 having a uniform height along a curved surface may be prepared on the first clamp 110 or the second clamp 120.

The flat portion 180 may have a flat shape with a uniform height along a curved surface and may be used to place the curved portion 190 on a fixed position (such as a position of a concrete structure) without inclining the curved portion 190. In this case, loads acting on the curved portion 190 may be transmitted through the flat portion 180.

Figure 10A:
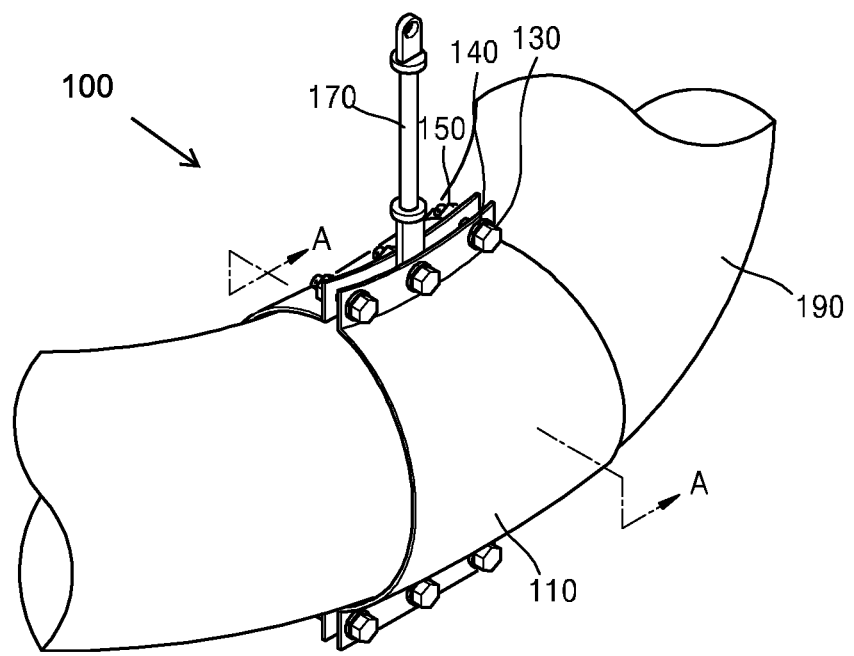
FIG. 10A is a view illustrating flat portions of the fastening-type pipe supporting apparatus according to an example embodiment.
Figure 10B:
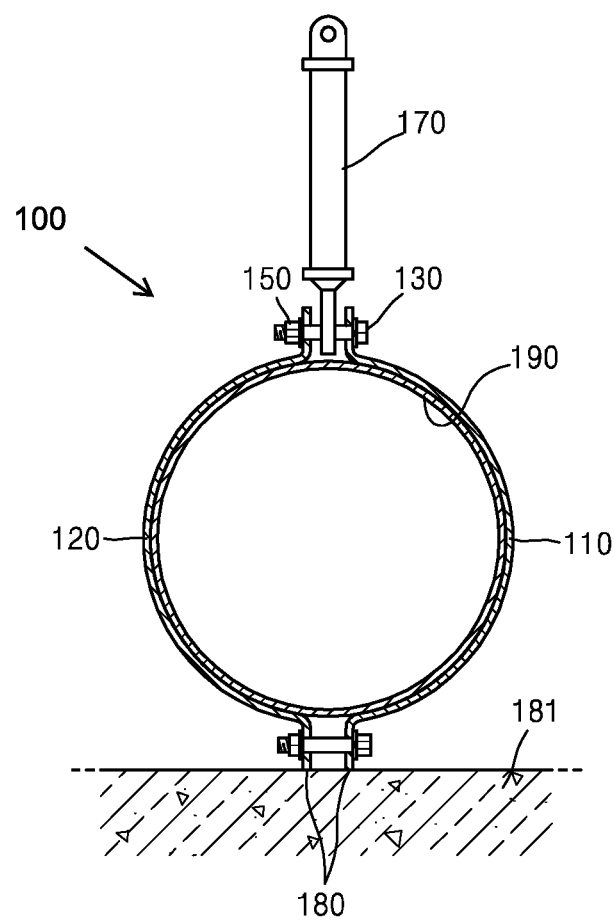
FIG. 10B is a cross-sectional view taken along line A-A of FIG. 10A.

The position of the flat portion 180 may be variously selected. Referring to FIGS. 10A and 10B, flat portions 180 may be formed on both the first and second connection portions 111 and 121. For example, loads acting on the curved portion 190 may be supported by placing the flat portions 180 formed on the first and second connection portions 111 and 121 on a flat concrete structure 181. The flat portions 180 may be used together with the supporting parts 170, or only the flat portions 180 may be used.

The curved portion 190 may be placed at various positions, and thus the locations of the flat portions 180 are not limited to the first and second connection portions 111 and 121. That is, the flat portions 180 may be variously formed according to the position of the curved portion 190.

The fastening-type pipe supporting apparatus 100 according to the embodiments may have following effects.

The fastening-type pipe supporting apparatus 100 is configured to support the curved portion 190 of a pipe using clamps having curved surfaces and to be easily attached to and detached from the curved portion. In addition, since the fastening-type pipe supporting apparatus 100 includes the clamps having curved surfaces, the fastening-type pipe supporting apparatus 100 may provide the same conditions as a fastening-type pipe supporting apparatus for a straight portion of a pipe. That is, various pipe supporting apparatuses may be implemented.

Unlike pipe supporting apparatuses of the related art, the fastening-type pipe supporting apparatus 100 according to the embodiments does not require welding of an attachment part to the curved portion of a pipe. Thus, the fastening-type pipe supporting apparatus 100 may be easily installed on the curved portion of a pipe in the field, and the thickness of the curved portion of the pipe may be measured. In addition, since the structural integrity of the pipe is not decreased by the fastening-type pipe supporting apparatus, it is not necessary to perform an additional local stress evaluation on the curved portion of the pipe. Therefore, pipes may be designed, manufactured, and installed with lower costs.

In addition, according to the embodiments, since a bracket 160, a stanchion 171, a lug 172, a shoe (not shown), or a skirt (not shown) is not directly welded to the curved portion of a pipe but is welded to the clamps, damage that may be caused by a heat-affected zone during a thinwall pipe welding process may be prevented, and the damage possibility of the pipe (the pressure retaining part) caused by a damaged pipe supporting apparatus may be eliminated, thereby improving considerably the safety of a power plant.

Furthermore, since the fastening-type pipe supporting apparatus 100 is usable for the curved portion of a pipe without limitations (in the related art, only attachment-type pipe supporting structures are used for curved portions of pipes, and if possible, supporting apparatuses are installed on straight portions of pipes instead of curved portions of the pipes), pipe supporting apparatuses may be installed at an optimal position in the process of pipe stress analysis. That is, if the curved portion of a pipe is found as an optimal pipe supporting position according to pipe stress analysis, the curved portion of the pipe may be selected as the installation portion of the fastening-type pipe supporting apparatus 100 without limitations. Therefore, efficient pipe stress analysis and optimized pipe design are possible. Thus, a time-consuming job for pipe stress analysis may be reduced, and fewer pipe supporting apparatuses may be installed at optimal installation positions. That is, pipe installation and maintenance costs may be reduced.

The fastening-type pipe supporting apparatus 100 according to the one or more of the above embodiments may be variously modified. Coupling parts or devices that may be used to join the first clamp 110 and the second clamp 120 surrounding the curved portion 190 are not limited to the connection bolts 130, the washers 140, and the nuts 150. That is, various coupling parts or devices may be used to joint the first and second clamps 110 and 120 together. For example, the first and second clamps 110 and 120 may be coupled to each other using connection bolts having curved sides and nuts having curved sides.

The curved portion 190 of a pipe encompasses various curved portions of pipes such as a 90-degree elbow, a 45-degree elbow, and other bending portions. In addition to supporting a curved portion 190 of a pipe, the fastening-type pipe supporting apparatus 100 of the embodiments may be used to support a pipe fitting such as a branch portion or a reducing portion by coupling the first clamp 110 and the second clamp 120 to each other according to the fitting. Furthermore, the fastening-type pipe supporting apparatus 100 may be implemented using one or more additional clamps in addition to the first clamp 110 and the second clamp 120. The branch portion may be a T-shaped portion, and the reducing portion may be a portion of a pipe having an increasing or decreasing diameter.

As described above, according to the one or more of the above example embodiments, the fastening-type pipe supporting apparatus is configured to support the curved portion of a pipe via clamps having curved surfaces and to be easily attached to and detached from the curved portion of the pipe.

In addition, the fastening-type pipe supporting apparatus does not require welding an attachment part to the curved portion of a pipe. Thus, the fastening-type pipe supporting apparatus may be easily installed on the curved portion of a pipe and the thickness of the curved portion of the pipe may be measured. Since the structural integrity of the pipe is not decreased by the fastening-type pipe supporting apparatus, it is not necessary to perform an additional local stress evaluation on the curved portion of the pipe. Therefore, pipes may be designed, manufactured, and installed with lower costs.

In addition, the fastening-type pipe supporting apparatus may be installed on the curved portion of a pipe without limitations. That is, pipe supporting apparatuses may be installed at an optimal position of a pipe in the process of pipe stress analysis.

It should be understood that the example embodiments described herein should be considered in a descriptive sense only and not for purposes of limitation. Descriptions of the features or aspects within each example embodiment should typically be considered as available for other similar features or aspects in other example embodiments.

While one or more example embodiments have been described with reference to the figures, it will be understood by those of ordinary skill in the art that various changes in form and details may be made therein without departing from the spirit and scope of the inventive concept as defined by the following claims.

What is claimed is:

1. A fastening-type pipe supporting apparatus for supporting a curved pipe against loads acting on a curved portion of the pipe, the fastening-type pipe supporting apparatus comprising:
   a first clamp having a curved surface with a curvature, a first curved lateral edge and a second curved lateral edge;
   wherein the curved surface of the first clamp has comprises a semicircular cross-sectional shape, wherein the first clamp comprises first and second curved connection portions extending outwardly from the first and second curved lateral edges, respectively, wherein each of the first and second curved connection portions comprises a concave surface and a convex surface extending the full length of the first clamp, and each of the first and second curved connection portions comprise a plurality of connection holes;
   a second clamp having a curved surface with a curvature, a third curved lateral edge, and a fourth curved lateral edge;
   wherein the curved surface of the second clamp has a semicircular cross-sectional shape, wherein the second clamp comprises third and fourth curved connection portions extending outwardly from the third and fourth curved lateral edges, respectively, wherein each of third and fourth curved connection portions comprises a concave surface and a convex surface extending the full length of the second clamp, and wherein each of the third and fourth curved connection portions comprises a plurality of connection holes;
   wherein the first clamp is smaller than the second clamp;
   at least one connection bolt coupling the first clamp with the second clamp;
   wherein the first clamp and the second clamp coupled by the at least one connection bolt is configured to surround the curved portion of the pipe; and
   at least one washer placed around the at least one connection bolt, wherein a side of the at least one washer is curved with a curvature and another side of the at least one washer is flat, wherein the side of the at least one washer being curved is in contact with one of the connection portions.

2. The fastening-type pipe supporting apparatus of claim 1, further comprising a supporting part coupled to the at least one connection bolt for supporting the curved portion of the pipe.

3. The fastening-type pipe supporting apparatus of claim 1, wherein a stanchion, or lug is provided on the curved surface of the first clamp or the curved surface of the second clamp for supporting the curved portion of the pipe.

* * * * *